July 5, 1938.  W. RUSH  2,122,955
COLLAPSIBLE WHEEL
Filed July 15, 1936   4 Sheets-Sheet 1

Inventor
William Rush

By Clarence A. O'Brien
Hyman Berman
Attorneys

July 5, 1938.　　　　W. RUSH　　　　2,122,955
COLLAPSIBLE WHEEL
Filed July 15, 1936　　　4 Sheets-Sheet 2
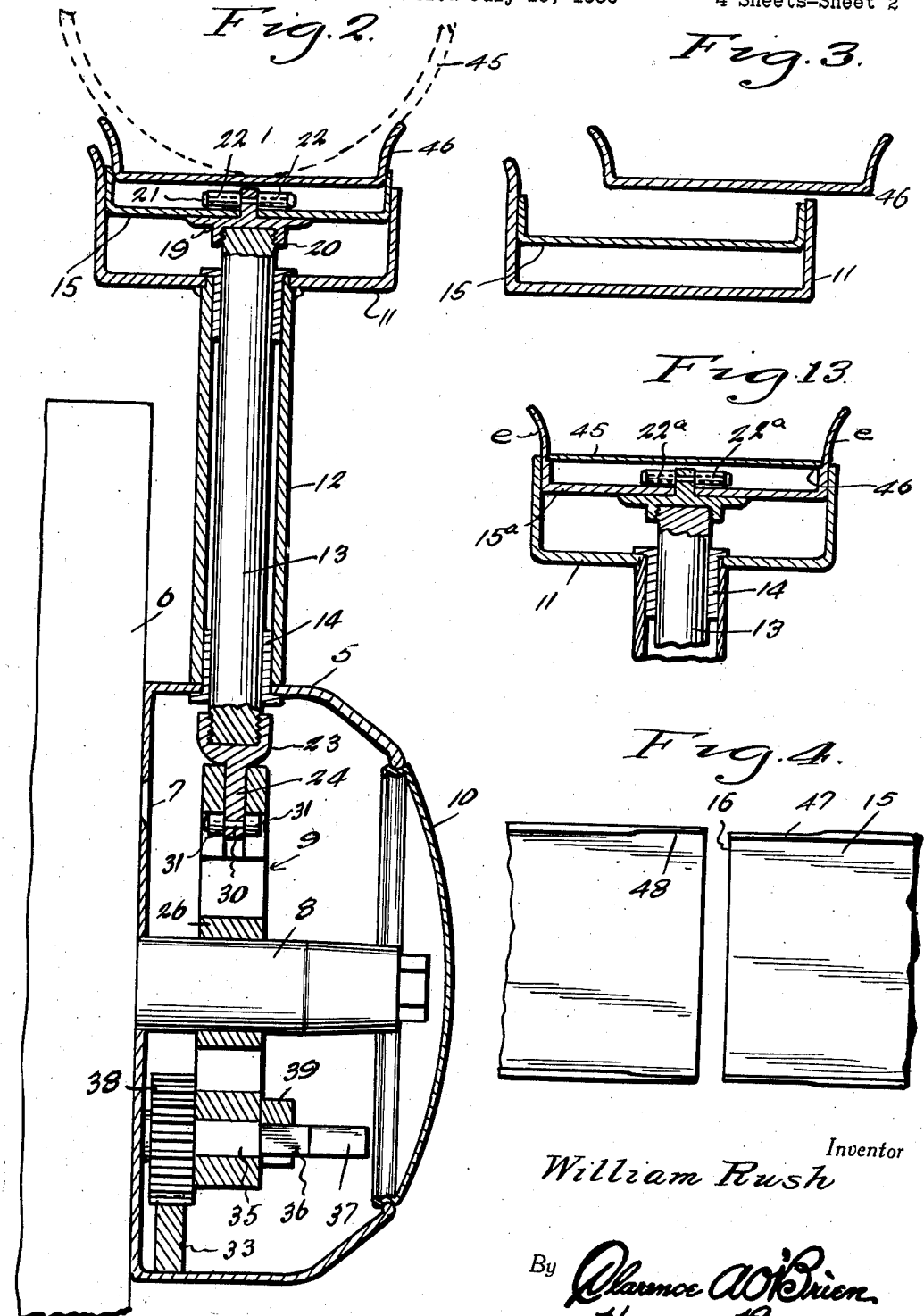
Inventor
William Rush
By Clarence A. O'Brien
Hyman Berman
Attorneys July 5, 1938.  W. RUSH  2,122,955
COLLAPSIBLE WHEEL
Filed July 15, 1936   4 Sheets-Sheet 3
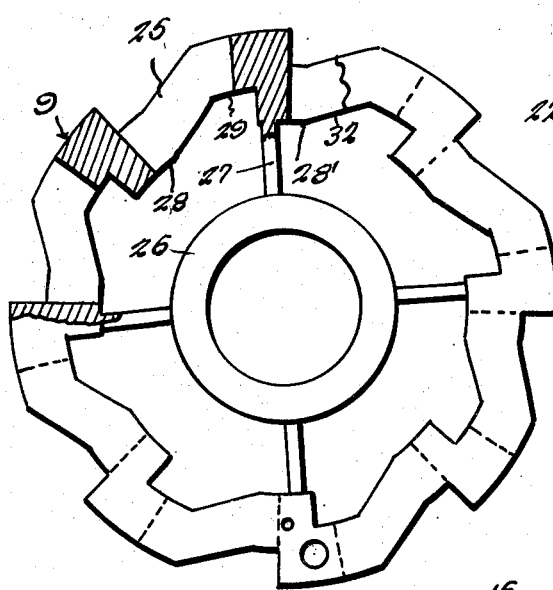
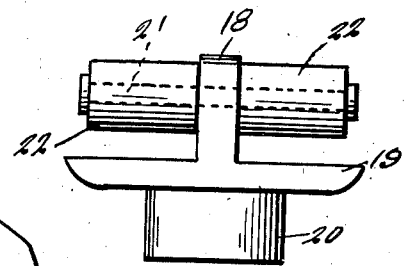
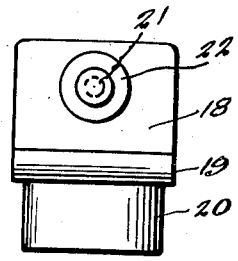
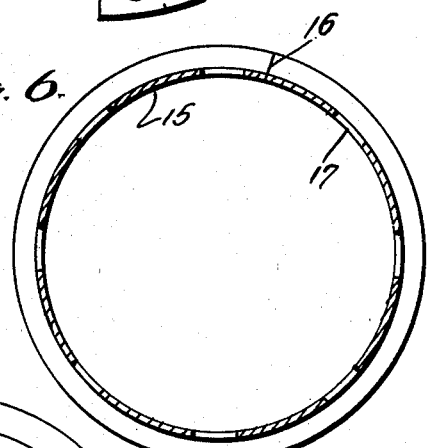
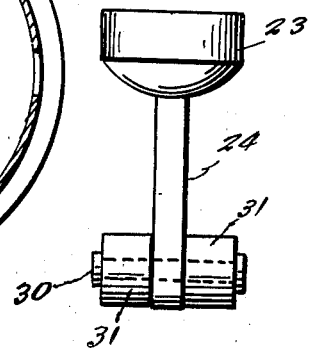
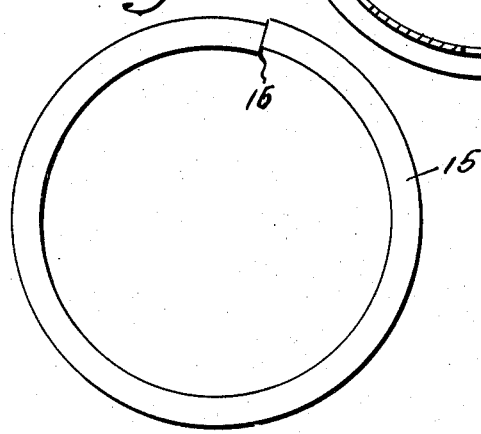
Inventor
William Rush
By Clarence A. O'Brien
Hyman Berman
Attorneys July 5, 1938.  W. RUSH  2,122,955
COLLAPSIBLE WHEEL
Filed July 15, 1936  4 Sheets-Sheet 4

Inventor
William Rush

By Clarence A. O'Brien
Hyman Berman
Attorneys

Patented July 5, 1938

2,122,955

UNITED STATES PATENT OFFICE 2,122,955

COLLAPSIBLE WHEEL

William Rush, Canonsburg, Pa.

Application July 15, 1936, Serial No. 90,762

3 Claims. (Cl. 301—16)

This invention appertains to new and useful improvements in vehicle wheels, and more particularly to a collapsible wheel structure wherein the tire-supporting part of the wheel can be reduced in circumference so that the tire can be readily removed or applied.

An important object of the invention is to provide single operating means for collapsible wheels whereby a wheel can be collapsed in one operation without requiring the removal and replacement of a number of nuts.

Another important object of the invention is to provide a collapsible wheel structure which is of simple construction, positive acting, and not susceptible to the ready development of defects.

These and various other important objects and advantages of the invention will become apparent to the reader of the following specification.

In the drawings:

Figure 2 is a sectional view on line 2—2 of Figure 1.

Figure 3 is a transverse sectional view of the rim and felly, showing the tire rim about to be removed.

Figure 4 is a fragmentary plan view showing the transverse split of the felly rim.

Figure 5 is a side elevational view of the felly rim with its ends offset and about to be collapsed.

Figure 6 is a longitudinal sectional view through the felly rim.

Figure 9 is a side elevational view of the cam assembly with parts in section.

Figure 10 is a side elevational view of one of the outer roller-carrying heads.

Figure 11 is another side elevational view of the head shown in Figure 10.

Figure 12 is a side elevational view of one of the inner roller-carrying heads.

Figure 13 is a fragmentary detailed sectional view showing a slightly modified form wherein the felly rim is used for supporting the casing.

Figure 1:
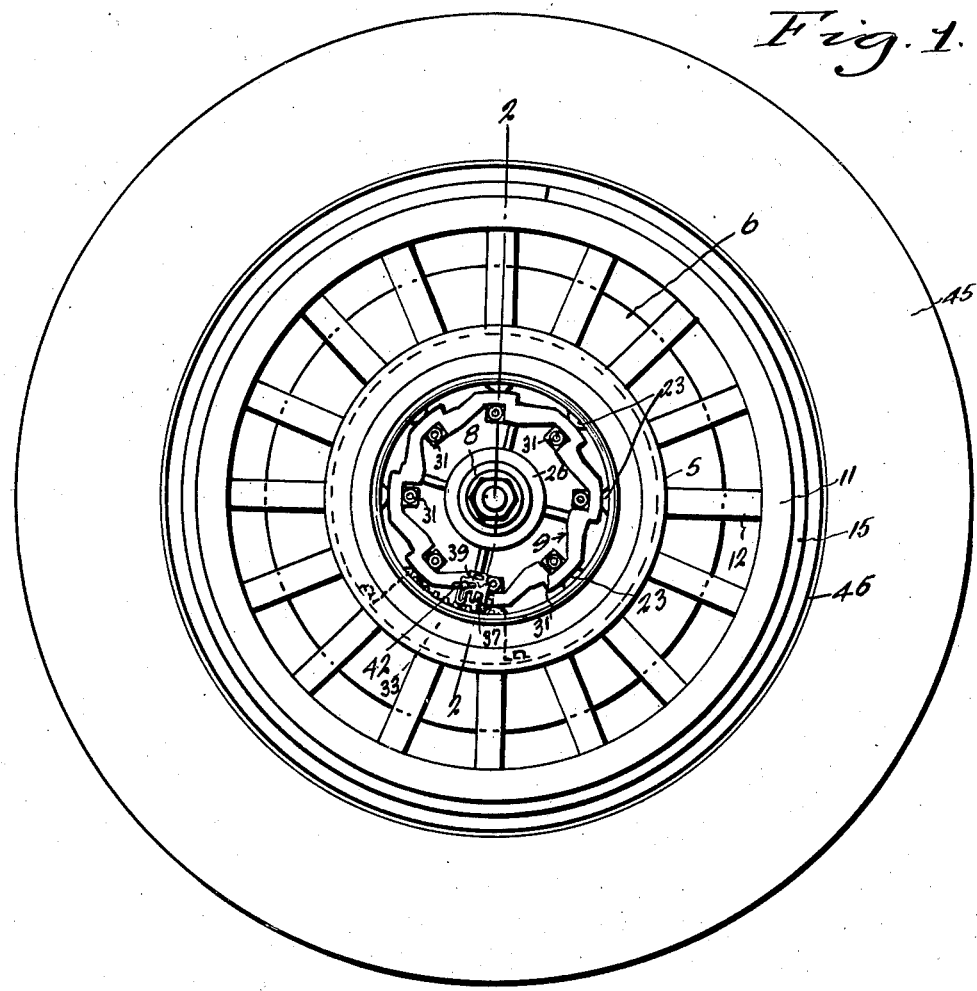
Figure 1 represents a side elevational view of the collapsible wheel with the hub cap removed.

Referring to the drawings, wherein like numerals designate like parts, it can be seen that numeral 5 represents the hollow hub shell to which the brake housing 6 is secured as at 7. Numeral 8 represents the axle barrel for projecting into the hub shell 5 and to this the cam assembly 9 is secured. The hub shell 5 is provided with an opening therein which is normally closed by the cap 10.

Extending from the hub shell 5 to the channeled felly 11 are the spokes 12, these spokes being hollow and having the rods 13 disposed therethrough, the ends of the spokes 12 having wear-resisting bushings 14 therein through which the said rods 13 are slidable.

The felly 11 has a transversely split band 15 radially slidable therein, this band 15 being transversely split as at 16. The bottom of this band 15 is provided at circumferentially spaced intervals with slots 17 which receive the outstanding lugs 18 on the head structures 19, each of which is provided with an internally threaded socket 20 for receiving the outer threaded end of the corresponding rod 13. Each of the lugs 18 is provided with a cross-pin 21 having a roller 22 on each end thereof for rolling contact with the outer side of the band 15.

The inner end of each of the rods 13 is provided with a head 23 socketed and internally threaded to receive the lower threaded end of the corresponding rod 13. Each of these heads 23 is provided with a reduced extension 24 for disposition into the corresponding slot 25 of the cam assembly 9. This cam assembly is in the form of an annulus connected to a hub 26 by spokes 27, the hub 26 being in turn secured to the axle barrel 8. The inner side of this cam annulus is provided with high points 28 and low points 29. The reduced extensions 24 of the heads 23 extend through the slots 25 and each is provided with a cross-pin 30 having a roller 31 on each end thereof for riding contact with the inner side of the cam assembly annulus.

Figure 7:
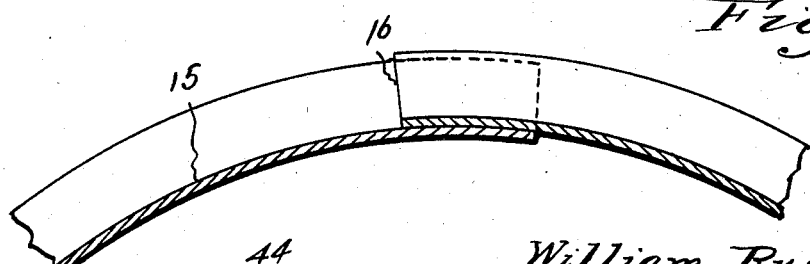
Figure 7 is a fragmentary enlarged longitudinal sectional view of the felly rim showing the ends overlapped.
Figure 8:
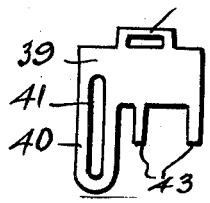
Figure 8 is an elevational view of the lock plate.

Normally, these rollers 31 seat in the cam assembly at the low points 29, and when the annulus is rotated, the rollers ride on the cam surfaces between the points 29—28 and pull in the rods 13 so as to contract the band 15. In order to break the band at the joint, one of the cam surfaces, denoted by numeral 32, is shorter than the other, so that the rollers which ride against the same will reach their high points 28' before the other rollers reach their high points so that one end of the band is pulled in as shown in Figure 5, so that subsequently the entire band is collapsed to the end-overlapping relationship shown in Figure 7.

Single operating means is employed for operating the cam assembly 9, and this consists of the arcuate-shaped rack 33 secured as at 34 to the inside of the shell 5. Secured to one end of the shaft 35, which is disposed transversely through the cam annulus is the gear 38. The portion of the shaft 35 which is disposed through the annulus is round, while the portion projecting outwardly of the annulus is square at the portion 36 and triangular in cross-section at the portion 37. The opposite end of the shaft 35 is provided with the gear 38 meshing with the rack 33.

A suitable hand crank can be engaged with the triangular portion 37 so that by rotating the same the gear 38 is caused to ride on the rack 33 and effect a rotary motion of the cam assembly.

Figure 14:
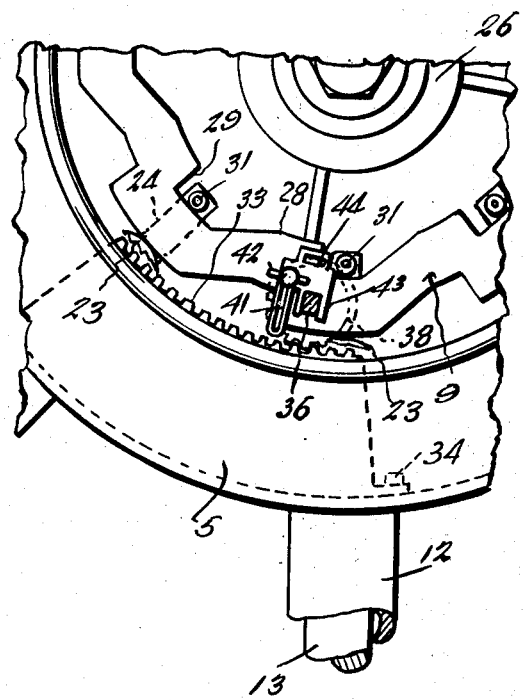
Figure 14 is an enlarged fragmentary front elevational view showing the cam assembly and means for operating the same.
Figure 15:
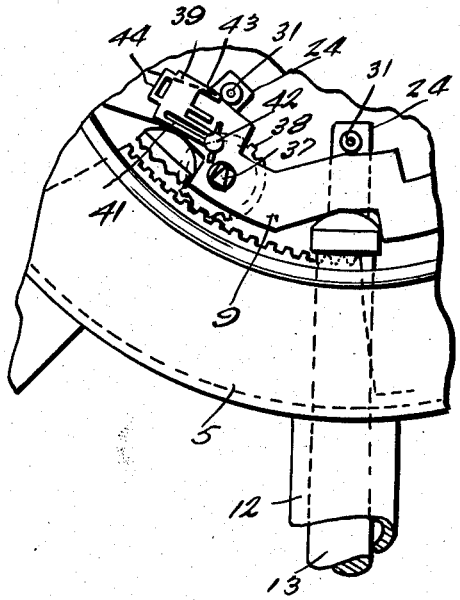
Figure 15 is a fragmentary side elevational view showing the cam assembly in operated position with the lock plate in unlocked position.
Figure 16:
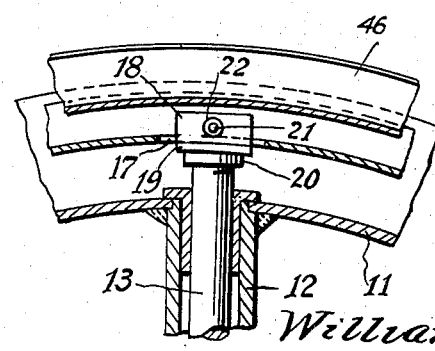
Figure 16 is a fragmentary side elevational view partly in section showing the connection between the rim and rods.

To lock the shaft 35 against rotation a lock plate 39 is employed, this lock plate being provided with an extension 40 having a slot 41 therein. A threaded stud extends from the annulus and has the wing nut 42 thereon. This stud projects through the slot 41. The slotted stud connection of the plate with the annulus permits the plate to be swung to the unlocked position in Figure 11. When the plate is in locked position, the parallel leg members 43 depend at opposite sides of the squared portion of the shaft 35 so as to prevent rotation of the shaft. When the plate is in this position, it is depending in the manner shown in Figure 14, and to secure the plate in position, the wing nut 42 can be tightened against the plate. The plate is also provided with a transversely extending slot 44 into which a tool, such as a screw driver, can be inserted for actuating the plate.

As shown in Figure 2, numeral 45 represents the usual tire casing equipped with the expanded rim 46. When the band 15 is in the retracted position shown in Figure 3, obviously the expanded rim 46 can be pushed over the felly and over the collapsed band 15, after which the rim 15 is permitted to expand to grip the expanded rim 46.

A slightly modified form of the invention is shown in Figure 13, wherein the felly rim 15a is also employed as the rim for the tire casing. As it would not be feasible to have the tire casing come directly against the rollers 22a, a band 45 is provided and extends circumferentially in the rim 15a and rests on circumferentially extended shoulders 46. This rim 15a is provided with wider flanges e—e than the flanges of the expanded rim 46. Obviously, when the rim 15a is collapsed, the same goes into the felly 11, leaving the tire in a position to be readily removed therefrom.

As is shown in Figure 4, it is preferable that the side flanges of the rim 15 and the rim 15a at the end portions thereof be reduced on one side as at 47 and reduced on the opposite side on the other end portion as at 48.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A wheel of the character described comprising a channeled felly, an axle-encircling cam annulus having cam surfaces thereon, rod members having their inner ends engaged with the said cam surfaces, a collapsible rim, connections between the outer ends of the rods and the said collapsible rim, said collapsible rim being radially slidable in the said felly, single operating means for rotating the said cam annulus, said means comprising a shaft on the annulus, a gear carried by the shaft, a rack secured in stationary position and with which the gear meshes, and a tool-engageable end construction on the shaft.

2. A wheel of the character described comprising a channeled felly, an axle-encircling radially slotted cam annulus having cam surfaces thereon, rod members having their inner ends engaged with the said cam surfaces and having guide extensions disposed through the slot of the annulus, a collapsible rim, connections between the outer ends of the rods and the said collapsible rim, said collapsible rim being radially slidable in the said felly, and a tire-supporting band disposed inside of the said rim.

3. A wheel of the character described comprising a channeled felly, an axle-encircling cam annulus having cam surfaces thereon, rod members having their inner ends engaged with the said cam surfaces, a collapsible rim, connections between the outer ends of the rods and the said collapsible rim, said collapsible rim being radially slidable in the said felly, said connections between the outer ends of the rods and the rim consisting in the provision of slots in the rim, reduced extensions on the outer ends of the rods projecting through the slots, and rollers on the outer ends of the said reduced extensions for engagement with the outside of the said rim.

WILLIAM RUSH.